United States Patent
Shestak (10) Patent No.: US 7,529,028 B2
(45) Date of Patent: May 5, 2009

(54) IMAGE DISPLAY APPARATUS (75) Inventor: Sergey Shestak, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 229 days.

(21) Appl. No.: 11/259,280

(22) Filed: Oct. 27, 2005

(65) Prior Publication Data
US 2006/0092158 A1   May 4, 2006

(30) Foreign Application Priority Data
Nov. 3, 2004   (KR) .................. 10-2004-0088904

(51) Int. Cl.
G02B 27/10 (2006.01)
G02B 3/08 (2006.01)

(52) U.S. Cl. ..................... 359/622; 359/742
(58) Field of Classification Search ......... 359/618–623, 359/626, 630, 742
See application file for complete search history.

(56) References Cited

U.S. PATENT DOCUMENTS

| | | | | |
|---|---|---|---|---|
| 3,623,789 A * | 11/1971 | Kawazu et al. | | 359/505 |
| 4,733,944 A | 3/1988 | Fahlen et al. | | |
| 5,270,859 A | 12/1993 | Wirth et al. | | |
| 5,296,922 A | 3/1994 | Mitani et al. | | |
| 5,465,475 A | 11/1995 | Kinoshita et al. | | |
| 5,499,438 A | 3/1996 | Schutz | | |
| 5,751,478 A * | 5/1998 | Yoshimura et al. | | 359/453 |
| 6,396,636 B2 * | 5/2002 | Sawaki et al. | | 359/624 |
| 6,462,794 B1 * | 10/2002 | Yoshikawa et al. | | 349/95 |
| 6,789,390 B2 * | 9/2004 | Hu et al. | | 60/773 |
| 7,154,675 B2 * | 12/2006 | Ishikawa et al. | | 359/622 |
| 7,242,526 B2 * | 7/2007 | Nemoto et al. | | 359/626 |
| 2002/0114078 A1 * | 8/2002 | Halle et al. | | 359/619 |
| 2003/0214577 A1 | 11/2003 | Ishikawa et al. | | |
| 2004/0085643 A1 | 5/2004 | Ishikawa et al. | | |

FOREIGN PATENT DOCUMENTS

| | | |
|---|---|---|
| JP | 3-89236 | 4/1991 |
| JP | 5-241110 | 9/1993 |
| JP | 7-306484 | 11/1995 |
| JP | 2001-356299 | 12/2001 |
| KR | 2001-89255 | 9/2001 |
| KR | 2003-87310 | 11/2003 |

OTHER PUBLICATIONS

Korean Office Action dated Mar. 30, 2006 issued in KR 2004-88904.
Dutch Search Report dated Feb. 28, 2008, of Dutch Patent Application No. 1030344.

* cited by examiner

Primary Examiner—Scott J Sugarman
Assistant Examiner—Dawayne A Pinkney
(74) Attorney, Agent, or Firm—Stanzione & Kim, LLP (57) ABSTRACT An image display apparatus to produce an erect real image of an object in space. The image display apparatus includes a housing to accommodate the object including an opening to secure a field of view of the object, and a microlens array installed within the housing between the object and the opening and having a plurality of microlenses. The image display apparatus inverts an image of the object so that a viewer can view the erect real image of the object in space.

15 Claims, 9 Drawing Sheets

IMAGE DISPLAY APPARATUS

CROSS-REFERENCE TO RELATED APPLICATIONS

This application claims priority from Korean Patent Application No. 2004-88904, filed on Nov. 3, 2004, in the Korean Intellectual Property Office, the disclosure of which is incorporated herein in its entirety by reference.

BACKGROUND OF THE INVENTION

1. Field of the Invention

The present general inventive concept relates to an image display apparatus capable of producing an image in free space, and more particularly, to an image display apparatus having a structure to produce an erect real image in free space.

2. Description of the Related Art

Generally, an image display apparatus displays an image of an object on a two-dimensional (2D) plane, i.e., a screen. Such images displayed on the 2D plane by the image display apparatus are not natural. In an attempt to overcome this problem, a variety of image display apparatuses for producing an image in free space have been developed.

An example of a conventional image display apparatus is disclosed in U.S. Pat. No. 4,671,625, entitled "Optical Apparatus for Producing a Natural, Viewable and Optically Interactive Image In Free Space" and patented on Jun. 9, 1987, which relates to an optical apparatus capable of producing an image in free space.

Figure 1:
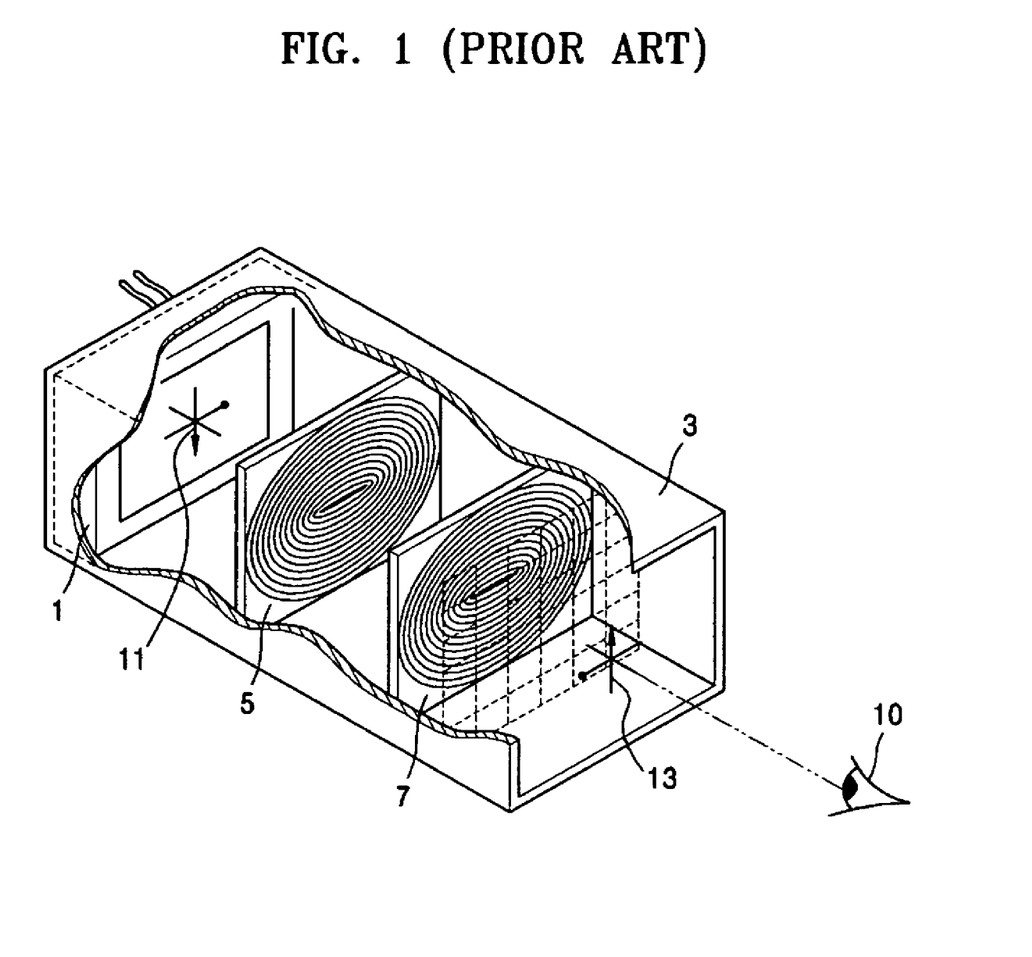
FIG. 1 is a perspective view of a conventional image display apparatus.

Referring to FIG. 1, the conventional image display apparatus includes an elongated tubular shroud 3 of a rectangular cross-section closed at one end by a cathode ray tube monitor 1. An optical system is provided within the shroud 3. The shroud 3 is made of opaque material and is provided with a non-reflective internal surface. The optical system deposed within the shroud includes a first convex lens 5 and a second convex lens 7, each having an f-number between about 0.5 and about 1.5. The first and second convex lenses 5 and 7 are both Fresnel lenses.

An image 13 of an object 11 displayed on the cathode ray tube monitor 1 is produced in front of the second convex lens 7 via the first and second convex lenses 5 and 7. Accordingly, a viewer 10 can see the image 13 floating in free space between the viewer 10 and the second convex lens 7.

However, the conventional image display apparatus provides an image that is not upright but upside down (i.e., left inverted). In addition, when the first and second convex lenses 5 and 7 have the f-number between about 0.5 and about 1.5, the distance between the object 11 and the second convex lens 7 must be equal to or greater than the length of a cross-section of the object 11. Accordingly, the conventional image display apparatus is long and it is difficult to make the conventional image display apparatus compact. Moreover, when a small lens having an f-number of about 0.5 is used, distortion and chromatic aberration may cause problems in the displayed image.

SUMMARY OF THE INVENTION

The present general inventive concept provides an image display apparatus that produces an erect image in free space with a reduction in distortion and chromatic aberration that can be made compact.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept may be achieved by providing an image display apparatus to produce an image of an object in free space. The image display apparatus includes a housing to accommodate the object and includes an opening to secure a field of view of the object, and a microlens array installed within the housing between the object and the opening and having a plurality of microlenses, wherein the image display apparatus inverts an image of the object so that an erect real image of the object is viewable in free space.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
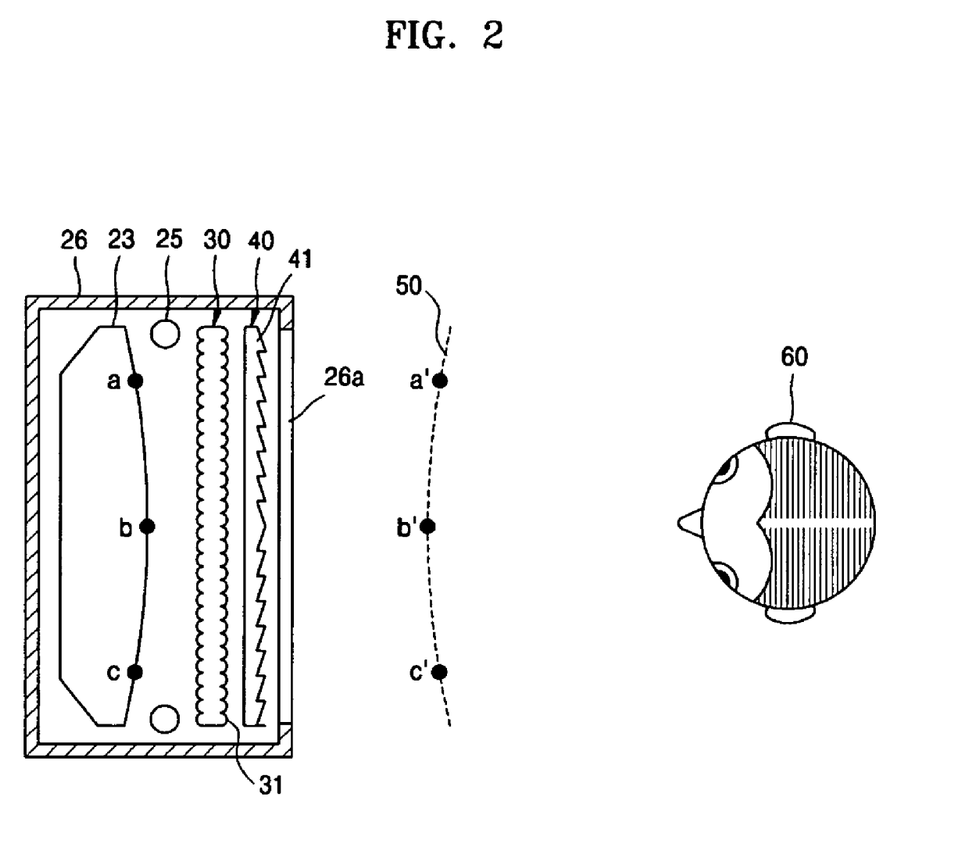
FIG. 2 is a sectional view of an image display apparatus according to an embodiment of the present general inventive concept.

Referring to FIG. 2, an image display apparatus according to an embodiment of the present general inventive concept includes a housing 26 and a microlens array 30 disposed within the housing 26 to produce an image 50 of an object 23, which is positioned in a space within the housing 26. The object 23 may be a thing having a predetermined volume with a minimal change, for example, a thing with bas-relief sculpture, a thing with intaglio, or a thing with an image formed level therewith.

The housing 26, which accommodates the object 23, has an opening 26a at one side to secure a field of view of the object 23. The opening 26a may be open, or the opening 26a may be covered with a transparent material (not shown).

The microlens array 30 is located between the object 23 and a viewer 60 and includes a plurality of microlenses 31. The microlens array 30 inverts an image of the object 23 and projects the image 50 into space so that the viewer 60 can see an erect real image of the object 23. Various embodiments of the microlens array 30 are described below.

In an embodiment of the present general inventive concept, the image display apparatus may further include a lighting unit 25 disposed within the housing 26 to illuminate the object 23. In addition, the image display apparatus may further include a condenser lens 40 disposed at a position within the housing 26 between the microlens array 30 and the opening 26a. The condenser lens 40 has a positive refractive power and increases a viewing range in which the image 50 produced in space is viewable. The condenser lens 40 may be a Fresnel lens 41.

The image display apparatus with the above-described structure produces the erect real image in space. In particular, three points a, b, and c of the object 23 are projected to three points a', b', and c' of the image 50 without being turned upside down. However, a convex surface of the object 23 may appear to be concave and a concave surface of the object 23 may appear to be convex. However, since the object 23 has a minimal change in volume, this does not affect the quality of the erect real image.

Hereinafter, embodiments of the microlens array 30 are described in detail with reference to FIGS. 3 through 9.

Figure 3:
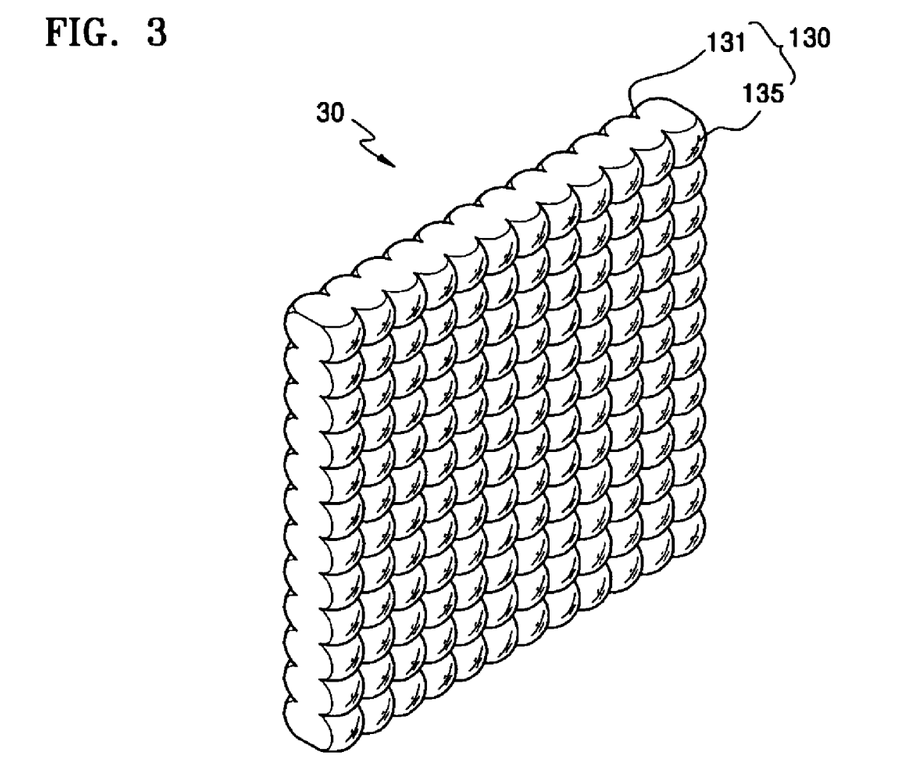
FIG. 3 is a perspective view of a microlens array of the image display apparatus of FIG. 2 according to an embodiment of the present general inventive concept.
Figure 4:
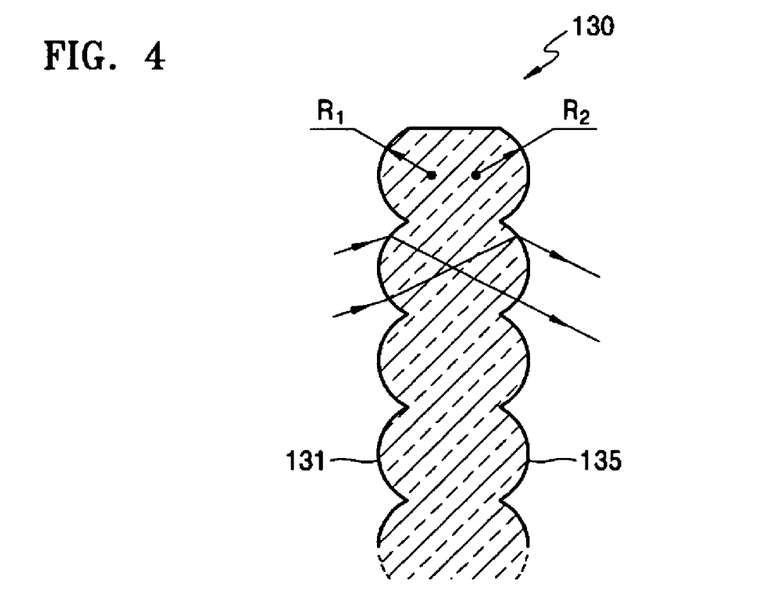
FIG. 4 is a sectional view of the microlens array of FIG. 3.

Referring to FIGS. 3 and 4, the microlens array 30 according to an embodiment of the present general inventive concept includes a single microlens array 130 including a first lens surface 131 and a second lens surface 135 to condense an image of the object (23 in FIG. 2) while the image passes between the first lens surface 131 and the second lens surface 135.

The first lens surface 131 includes a plurality of spherical microlenses having a first radius $R_1$ arranged in a two-dimensional (2D) array. The second lens surface 135 is disposed at a back side of the first lens surface 131 and includes a plurality of spherical microlenses having a second radius $R_2$ arranged in a 2D array. Referring to FIG. 4, the plurality of microlenses included in the first lens surface 131 are arranged to respectively correspond to the plurality of microlenses included in the second lens surface 135 such that the image of the object is primarily condensed between the first and second lens surfaces 131 and 135. The condensed image is inverted and passes through the second lens surface 135. Beams of the image that are obliquely incident upward on the first lens surface 131 are directed downward when the beams pass through the second lens surface 135. Conversely, beams of the image that are obliquely incident downward on the first lens surface 131 are directed upward when the beams pass through the second lens surface 135. Accordingly, the three points a', b', and c' of the image 50 (see FIG. 2) that correspond to the three points a, b, and c of the object 23 (see FIG. 2) are located at corresponding positions without being turned upside down. This causes beams of the image to be re-directed toward image points a', b', and c' that correspond to the object points a, b, and c, respectively, such that the image has an upright position. Without this re-direction to invert the image, the image would be turned upside down and would not be upright.

The first radius $R_1$ of curvature of microlenses included in the first lens surface 131 and the second radius $R_2$ of curvature of microlenses included in the second lens surface 135 can be set independently and may have values that are the same or different from each other.

Figure 5:
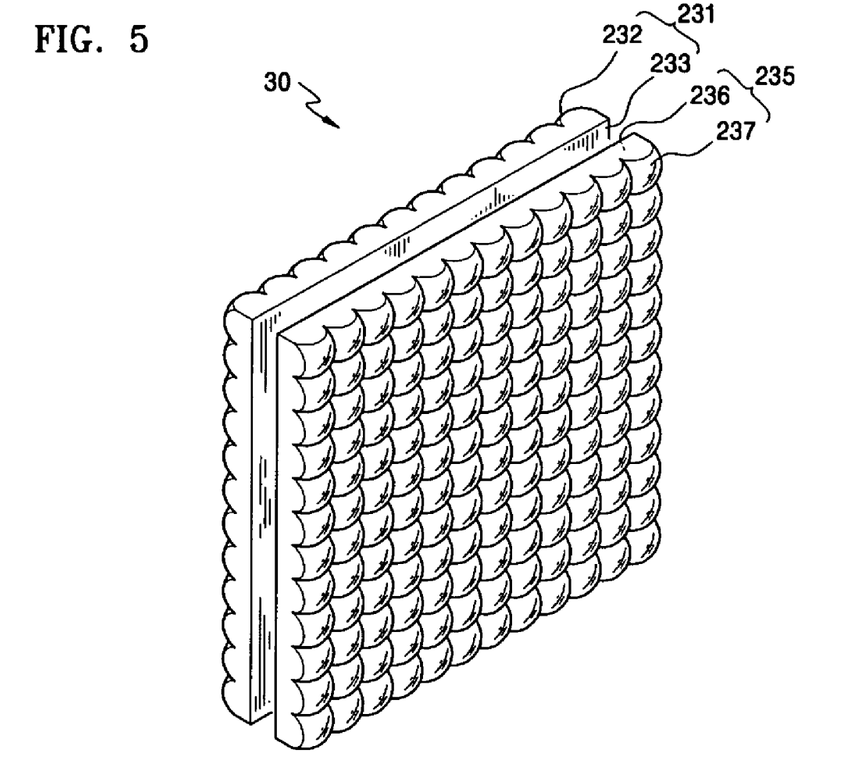
FIG. 5 is a perspective view of a microlens array of the image display apparatus of FIG. 2 according to another embodiment of the present general inventive concept.
Figure 6:
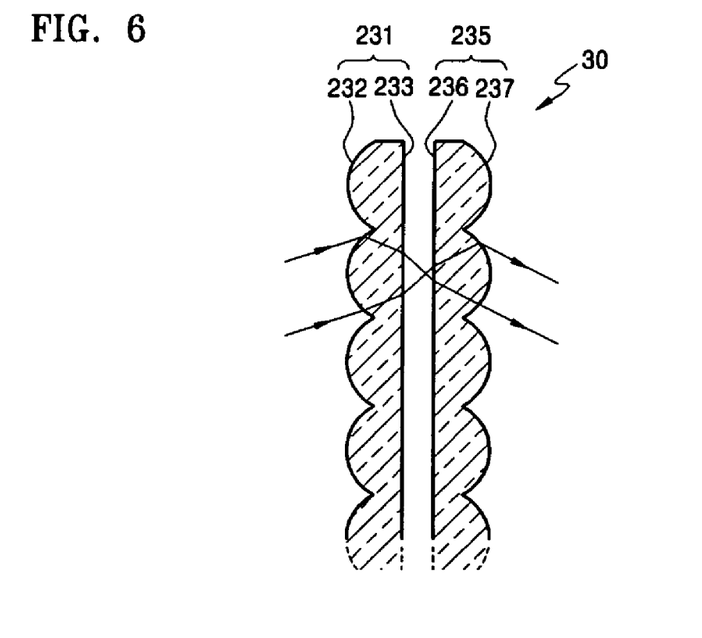
FIG. 6 is a sectional view of the microlens array of FIG. 5.

Referring to FIGS. 5 and 6, the microlens array 30 according to another embodiment of the present general inventive concept includes a first microlens array 231 and a second microlens array 235, which are separated from each other. The first microlens array 231 includes a first lens surface 232 having a plurality of spherical microlenses arranged in a 2D array and a first plane 233 disposed at a back side of the first lens surface 232. The second microlens array 235 includes a second plane 236 facing the first plane 233 and a second lens surface 237 having a plurality of spherical microlenses arranged in a 2D array at a back side of the second plane 236 opposite from the first plane 233. Referring to FIG. 6, the plurality of microlenses included in the first lens surface 232 are arranged to respectively correspond to the plurality of microlenses included in the second lens surface 237 so that the image of the object is primarily condensed between the first and second lens surfaces 232 and 237.

Figure 7:
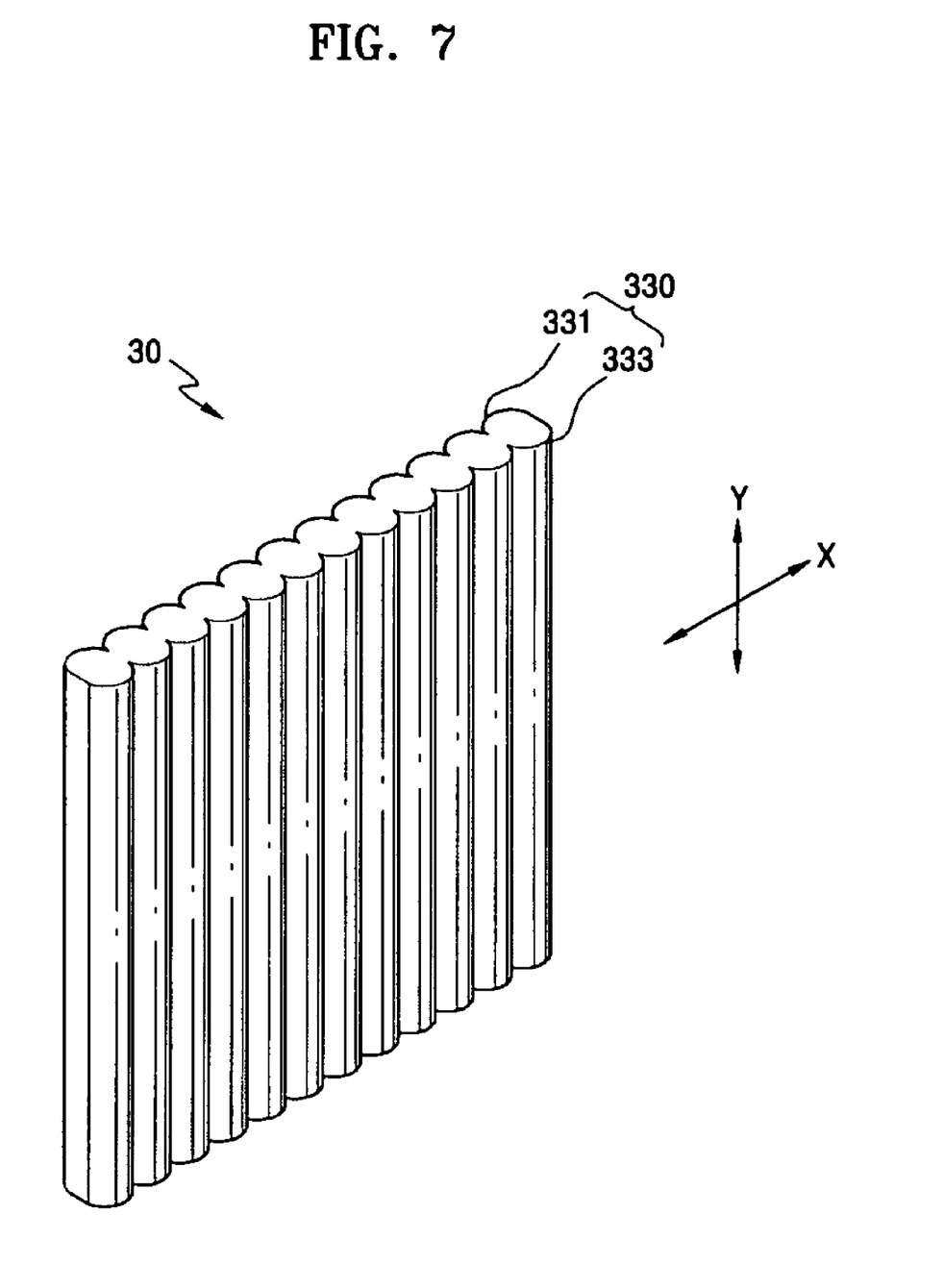
FIG. 7 is a perspective view of a microlens array of the image display apparatus of FIG. 2 according to another embodiment of the present general inventive concept.

Referring to FIG. 7, the microlens array 30 according to another embodiment of the present general inventive concept includes a single microlens array 330 including a first lens surface 331 and a second lens surface 333 to condense an image of the object (23 in FIG. 2) that passes between the first lens surface 331 and the second lens surface 333.

The first lens surface 331 includes a plurality of cylindrical lenticular lenses that are adjacent to each other. The cylindrical lenticular lenses included in the first lens surface 331 have a lens shape in an X-axis direction. In other words, the cylindrical lenticular lenses extend longitudinally in a Y-axis direction. The second lens surface 333 is disposed at a back side of the first lens surface 331 and includes a plurality of cylindrical lenticular lenses that are adjacent to each other. The lenticular lenses included in the first lens surface 331 and the lenticular lenses included in the second surface 333 may be symmetric with respect to each other.

Figure 8:
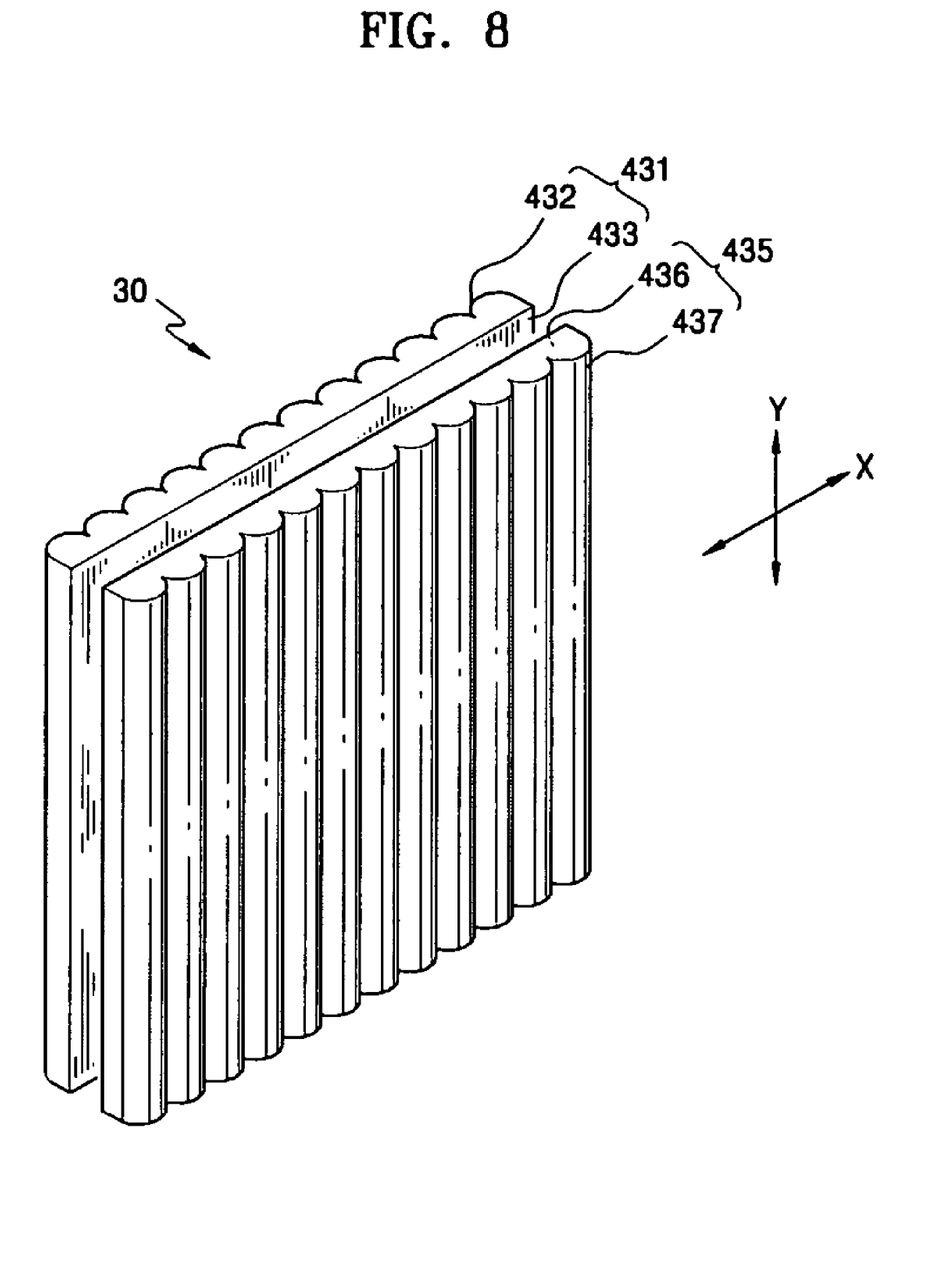
FIG. 8 is a perspective view of a microlens array of the image display apparatus of FIG. 2 according to another embodiment of the present general inventive concept.

Referring to FIG. 8, the microlens array 30 according to another embodiment of the present general inventive concept includes a first microlens array 431 and a second microlens array 435, which are separated from each other. The first microlens array 431 includes a first lens surface 432 having a plurality of cylindrical lenticular lenses that are adjacent to each other and a first plane 433 disposed at a back side of the first lens surface 432. The second microlens array 435 includes a second plane 436 facing the first plane 433 and a second lens surface 437 opposite the first plane 433 and having a plurality of cylindrical lenticular lenses that are adjacent to each other. The lenticular lenses included in the first lens surface 432 are arranged to respectively correspond to the lenticular lenses included in the second lens surface 437. Each of the lenticular lenses has a lens shape in the X-axis direction. In other words, the lenticular lenses extend longitudinally in the Y-axis direction. Accordingly, a horizontal parallax occurs so that an image perceived by a viewer's left eye is different from an image perceived by the viewer's right eye. As a result, the viewer can observe an object in three dimensions.

Figure 9:
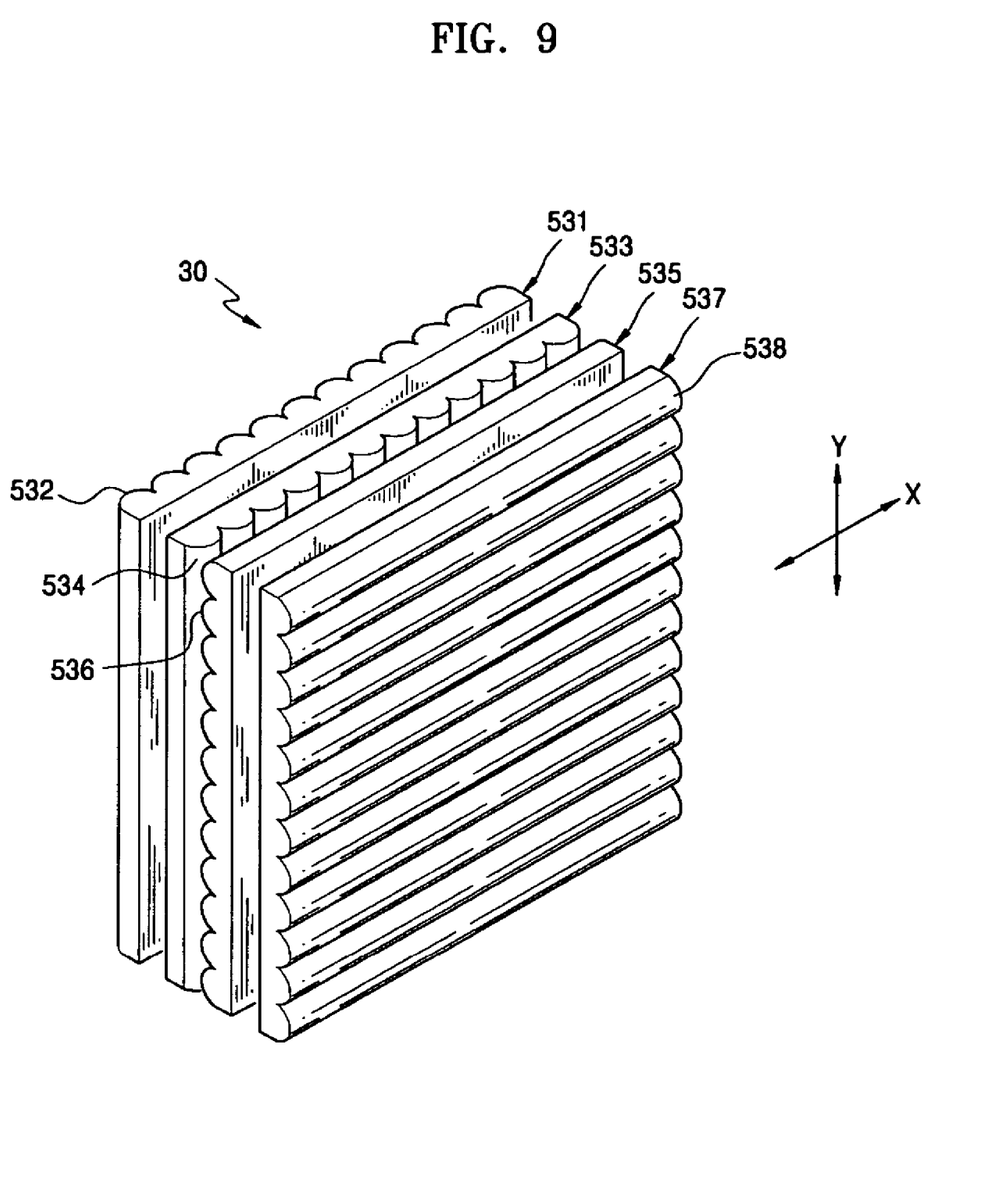
FIG. 9 is a perspective view of a microlens array of the image display apparatus of FIG. 2 according to another embodiment of the present general inventive concept.

Referring to FIG. 9, the microlens array 30 according to another embodiment of the present general inventive concept includes first, second, third, and fourth microlens arrays 531, 533, 535, and 537, which are separated from one another. The first, second, third, and fourth microlens arrays 531, 533, 535, and 537 include first, second, third, and fourth lens surfaces 532, 534, 536, and 538, respectively, having a plurality of cylindrical lenticular lenses that are adjacent to each other.

The lenticular lenses included in the first lens surface 532 are arranged to respectively correspond to the lenticular lenses included in the second lens surface 534. Each of the lenticular lenses has a lens shape in the X-axis direction (i.e., extending along the Y-axis direction). The lenticular lenses included in the third lens surface 536 are arranged to respectively correspond to the lenticular lenses included in the fourth lens surface 538. Each of the lenticular lenses has a lens shape in the Y-axis direction (i.e., extending along the X-axis direction). The lenticular lenses included in the first and second microlens arrays 531 and 533 may be perpendicular to the lenticular lenses included in the third and fourth microlens arrays 535 and 537. Alternatively, the lenticular lenses of the first, second, third, and fourth microlens arrays 531, 533, 535, and 537 may be arranged in other directions.

The first and second microlens arrays 531 and 533 perform substantially the same function as the two microlens arrays having spherical microlenses described with reference to FIGS. 3 through 6.

The following description concerns an image produced in space by an image display apparatus according to various embodiments of the present general inventive concept.

Figure 10:
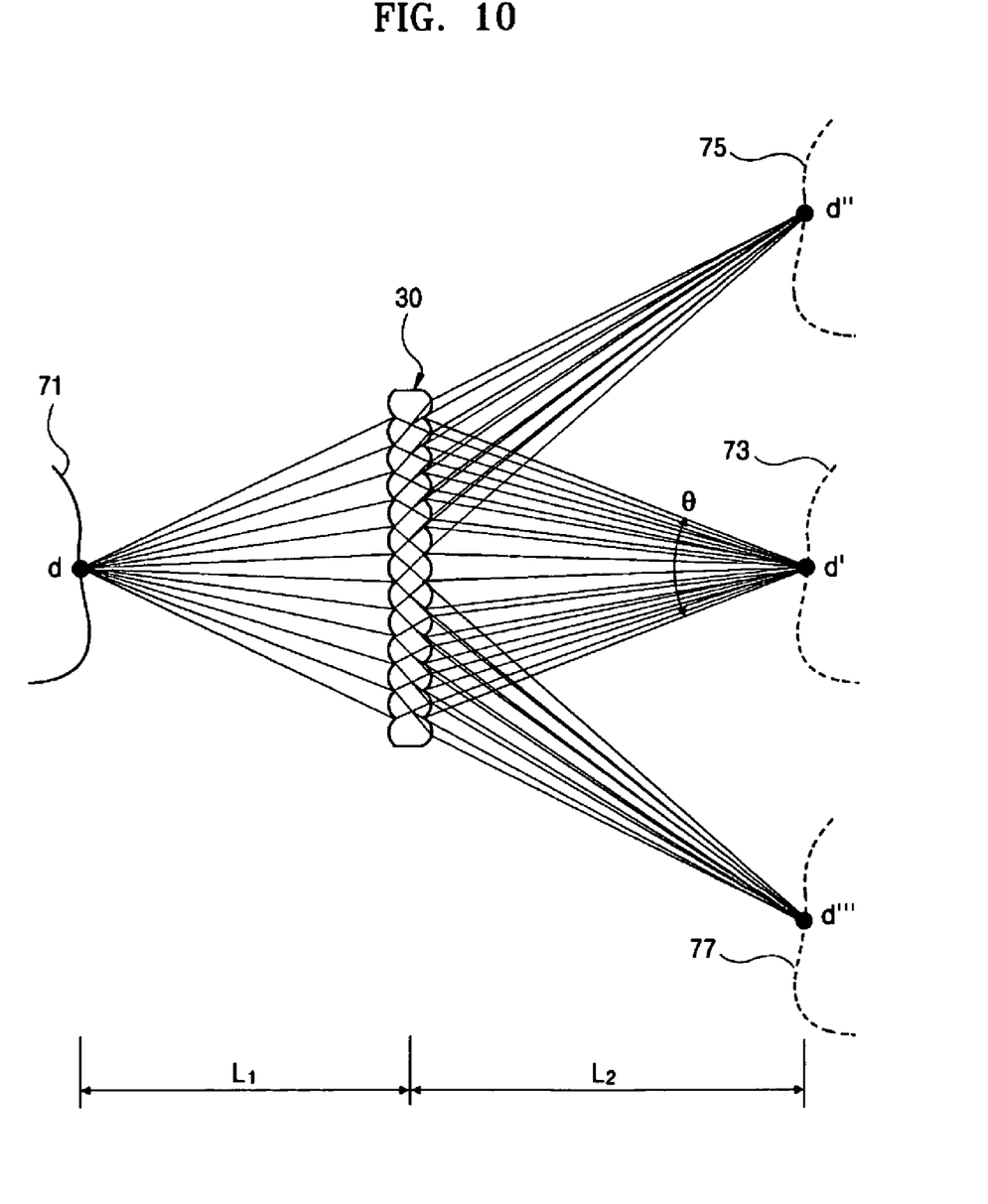
FIG. 10 illustrates a real image produced by the image display apparatus of FIG. 2.

FIG. 10 illustrates an image produced using the microlens array 30. An image of an object 71 is inverted and enlarged by the microlens array 30 and formed on an image forming plane in an upright position. In other words, an arbitrary point d of the object 71 is converted into points d', d'', and d''' of first, second, and third images 73, 75, and 77, respectively, in a space in front of the microlens array 30. Through this conversion, the first, second, and third images 73, 75, and 77 are produced to correspond to the object 71. That is, the image of the object 71 can be viewable according to a parallax, for example, the first, second, and third images 73, 75, and 77.

When a first distance between the point d of the object 71 and the microlens array 30 is represented by $L_1$ and first and second focal lengths of microlenses respectively formed on opposite surfaces of the microlens array 30 are represented by $F_1$ and $F_2$, respectively, a second distance $L_2$ between the microlens array 30 and the point d'of the first image 73 corresponding to the point d of the object 71 satisfies Equation 1.

$$L_2 = L_1 \times \frac{F_2}{F_1} \quad (1)$$

Here, the first distance $L_1$ can be shortened as compared to the conventional image display apparatus, and therefore, a compact image display apparatus can be provided.

When the point d of the object 71 is converted into the point d' of the first image 73, a cone-shaped beam having an angle of θ converges via all of the microlenses included in the microlens array 30. As described above, since the first, second, and third images 73, 75, and 77 are produced via every microlens of the microlens array 30, chromatic aberration, spherical aberration, and distortion can be minimized.

The angle θ does not exceed a maximum angle of $θ_{max}$ expressed as Equation 2.

$$θ_{max} = 2\tan^{-1} \frac{p}{2F_2} \quad (2)$$

where "p" denotes a pitch between microlenses included in the microlens array 30.

Figure 11:
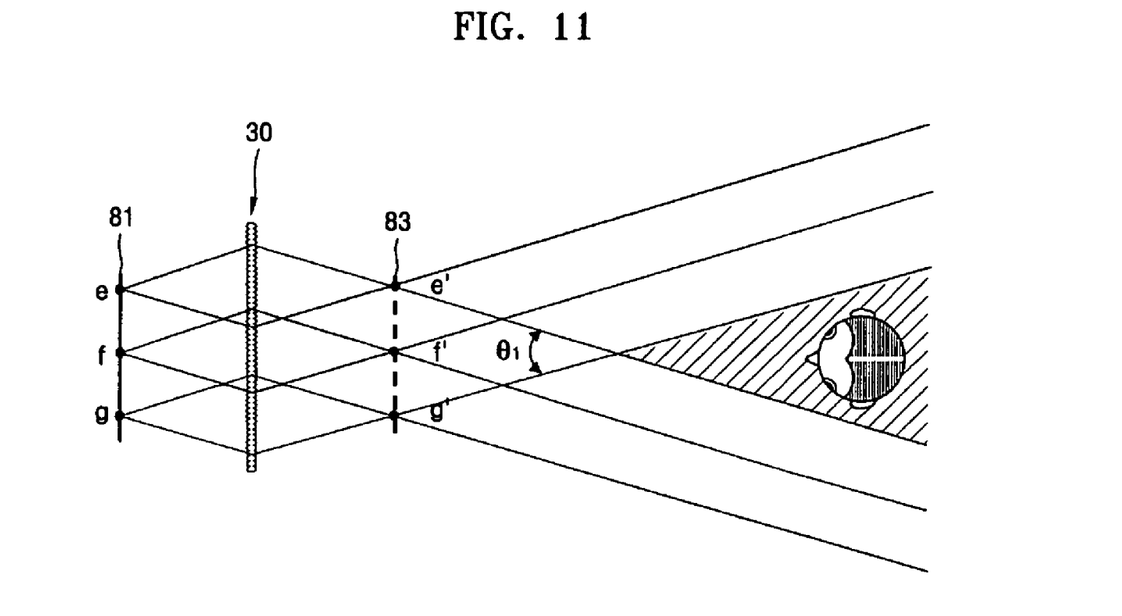
FIGS. 11 and 12 illustrate viewing ranges when a condenser lens is not present and when a condenser lens is present, respectively, in the image display apparatus of FIG. 2.
Figure 12:
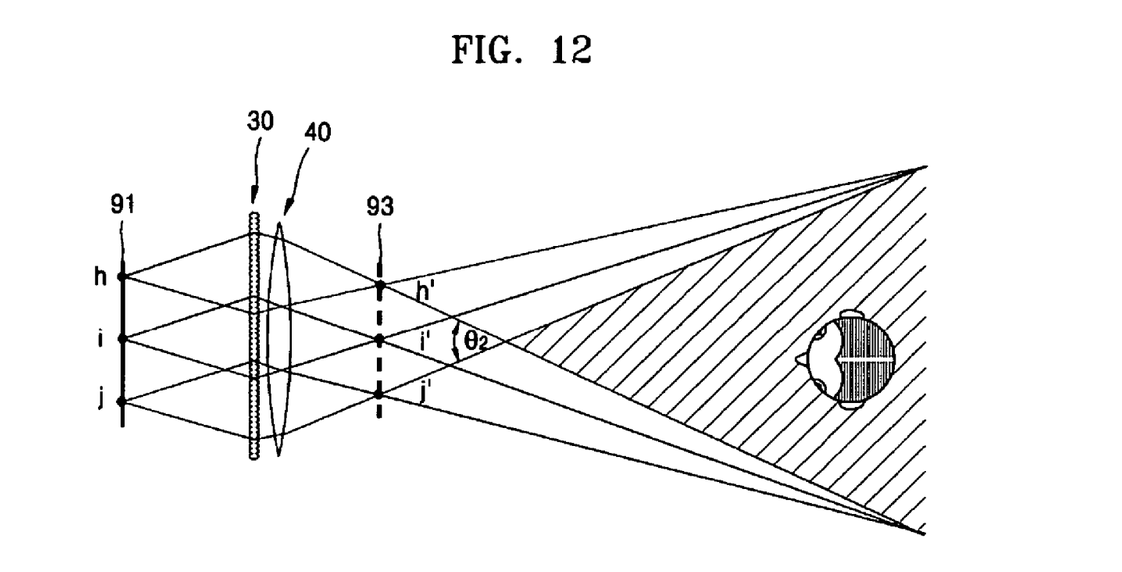

FIGS. 11 and 12 illustrate viewing ranges of an image display apparatus according to various embodiments of the present general inventive concept. Referring to FIG. 11, an image display apparatus does not include a condenser lens, in which the microlens array 30 converts points e, f, and g of an object 81 into points e', f', and g' of an image 83 produced in free space. The points e', f', and g' of the image 83 are limited to a hatched range, and therefore, a maximum angle of the viewing range is $θ_1$. Referring to FIG. 12, an image display apparatus includes a condenser lens 40, in which the microlens array 30 converts points h, i, and j of an object 91 into points h', i', and j'of an image 93 produced in free space. The points h', i', and j' of the image 93 are limited to a hatched range, and therefore, a maximum angle of the viewing range is $θ_2$. Here, the two maximum angles $θ_1$ and $θ_2$ satisfy a condition of $θ_2 > θ_1$, and therefore, a wider viewing range can be obtained when the condenser lens 40 is provided. As a result, a small and compact image display apparatus can be provided.

As described above, an image display apparatus according to various embodiments of the present general inventive concept inverts an image of an object using a microlens array and thereby produces an erect real image in space. In addition, when using the microlens array, the number of optical elements needed to produce the image in the space can be minimized, and therefore, all of the optical elements can be disposed within small space. As a result, a small and compact image display apparatus can be easily manufactured. In addition, when a condenser lens is further provided in an image display apparatus, an image produced in space can be viewed at a wider viewing range.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image display apparatus to produce an image of an object in free space, comprising:
   a housing to accommodate the object and including an opening to secure a field of view of the object; and
   a microlens array installed within the housing between the object and the opening and having a plurality of microlenses to project an image of the object, and
   a condenser lens installed within the housing between the microlens array and the opening, the condenser lens having a positive refractive power and increasing a viewing range,
   wherein the image display apparatus inverts an image of the object within the microlens array so that an erect real image of the object is viewable in free space.

2. The image display apparatus of claim 1, wherein the microlens array comprises a single microlens array having a first lens surface including a plurality of spherical microlenses arranged in a two-dimensional array and a second lens surface disposed at a back side of the first lens surface including a plurality of spherical microlenses arranged in a two-dimensional array, and the image of the object is primarily condensed while passing between the first and second lens surfaces.

3. The image display apparatus of claim 1, wherein the microlens array comprises:
   a first microlens array having a first lens surface that includes a plurality of spherical microlenses arranged in a two-dimensional array; and
   a second microlens array separated from the first microlens array and having a second lens surface that includes a plurality of spherical microlenses arranged in a two-dimensional array, and the image of the object is primarily condensed while passing between the first and second lens surfaces.

4. The image display apparatus of claim 1, wherein the microlens array comprises a single microlens array having a first lens surface that includes a plurality of cylindrical lenticular lenses disposed adjacent to each other and a second lens surface disposed at a back side of the first lens surface that includes a plurality of cylindrical lenticular lenses disposed adjacent to each other, and the image of the object is primarily condensed while passing between the first and second lens surfaces.

5. The image display apparatus of claim 4, wherein the cylindrical lenticular lenses of the first lens surface and the cylindrical lenticular lenses of the second surface are symmetric.

6. The image display apparatus of claim 1, wherein the microlens array comprises:
   a first microlens array having a first lens surface that includes a plurality of cylindrical lenticular lenses disposed adjacent to each other; and
   a second microlens array separated from the first microlens array having a second lens surface that includes a plurality of cylindrical lenticular lenses disposed adjacent to each other, and the image of the object is primarily condensed while passing between the first and second lens surfaces.

7. The image display apparatus of claim 6, wherein the cylindrical lenticular lenses of the first lens surface and the cylindrical lenticular lenses of the second surface are symmetric.

8. The image display apparatus of claim 7, wherein the microlens array further comprises:
   a third microlens array separated from the second microlens array having a third lens surface that includes a plurality of cylindrical lenticular lenses disposed adjacent to each other; and
   a fourth microlens array separated from the third microlens array having a fourth lens surface that includes a plurality of cylindrical lenticular lenses disposed adjacent to each other.

9. The image display apparatus of claim 8, wherein the cylindrical lenticular lenses of the third lens surface and the cylindrical lenticular lenses of the fourth surface are symmetric, and the cylindrical lenticular lenses of the third and fourth lens surfaces are arranged in a different direction than the cylindrical lenticular lenses of the first and second lens surfaces.

10. The image display apparatus of claim 1, wherein the condenser lens comprises a Fresnel lens.

11. The image display apparatus of claim 1, further comprising:
   a lighting unit disposed within the housing to illuminate an inside of the housing.

12. The image display apparatus of claim 1, wherein the microlens array comprises one of:
   a plurality of spherical lens; and
   a plurality of cylindrical lenses.

13. The image display apparatus of claim 1, wherein the plurality of microlenses comprises a first lens part having a first focal length F1 to receive beams of the image from an object point, a second lens part having a second focal length F2 to output the beams of the image to an image point, and the first focal length F1 and the second focal length F are related by:

$$L2 = L1 \times F2/F1$$

where L1 is a first distance from the object point to the microlens array, and L is a second distance from the image point to the microlens array.

14. The image display apparatus of claim 13, wherein a maximum viewing angle is given by where p represents a pitch of the plurality of microlenses.

15. A method of a display apparatus including a micro lens array and a condenser lens, the method comprising:
   receiving image beams from an object plane at a first lens surface having a first plurality of micro lenses each having a first focal point Fl and inverting the received image;
   projecting the received image beams from a second lens surface having a second plurality of micro lenses each having a second focal point F2 to an image plane according to $L2 = L1 \times F2/F1$ where L1 is a first distance from the object plane to the first lens surface and L2 is a second distance from the image plane to the second lens surface; and
   increasing a viewing range by passing the projected image through the condenser lens.

* * * * *